Aug. 14, 1956
J. M. CHRISTMAN
2,758,512
APPARATUS FOR CHAMFERING INTERNAL GEARS
Filed March 30, 1953
3 Sheets-Sheet 1
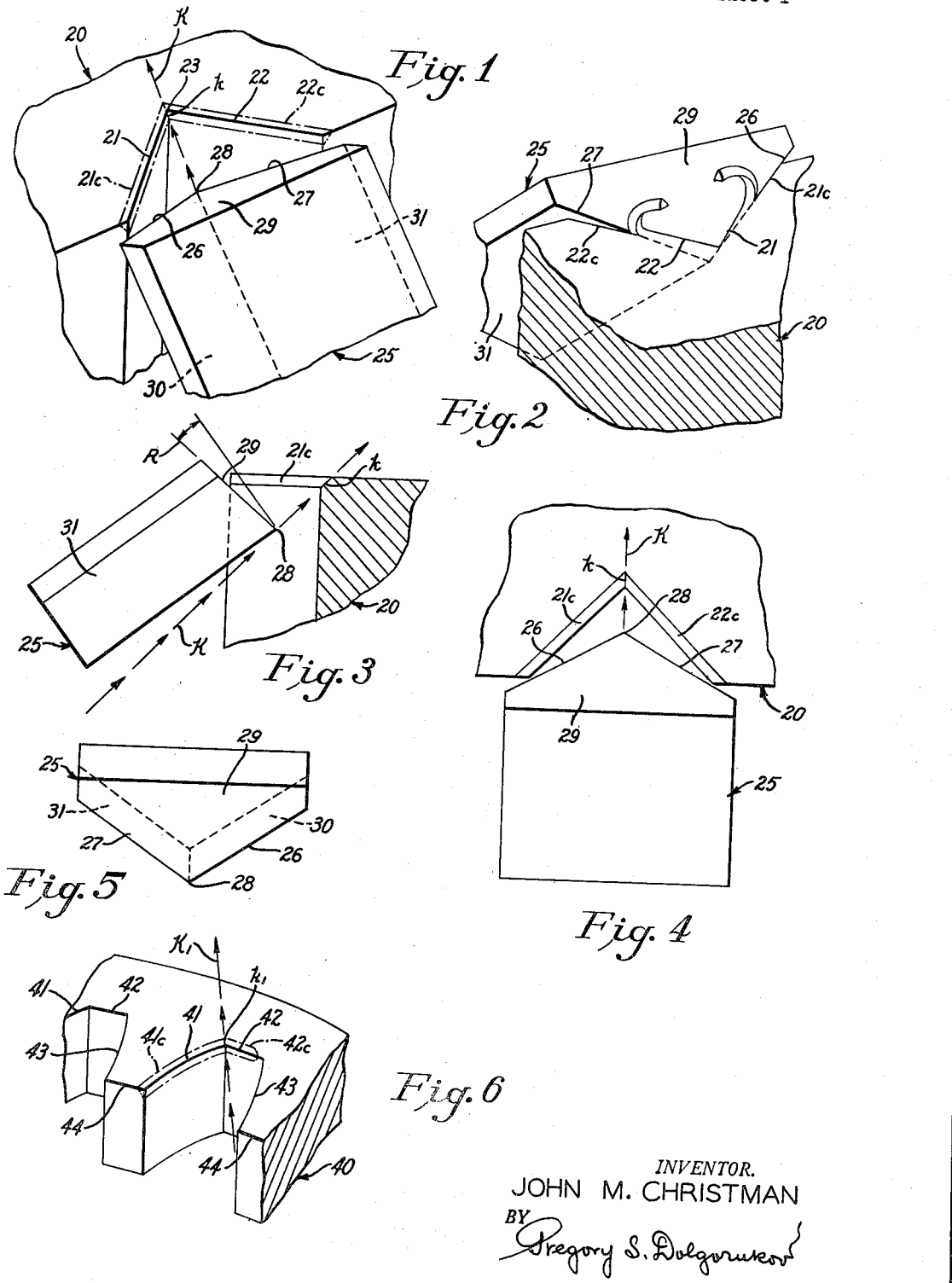
INVENTOR.
JOHN M. CHRISTMAN
BY Gregory S. Dolgorukov
ATTORNEY.

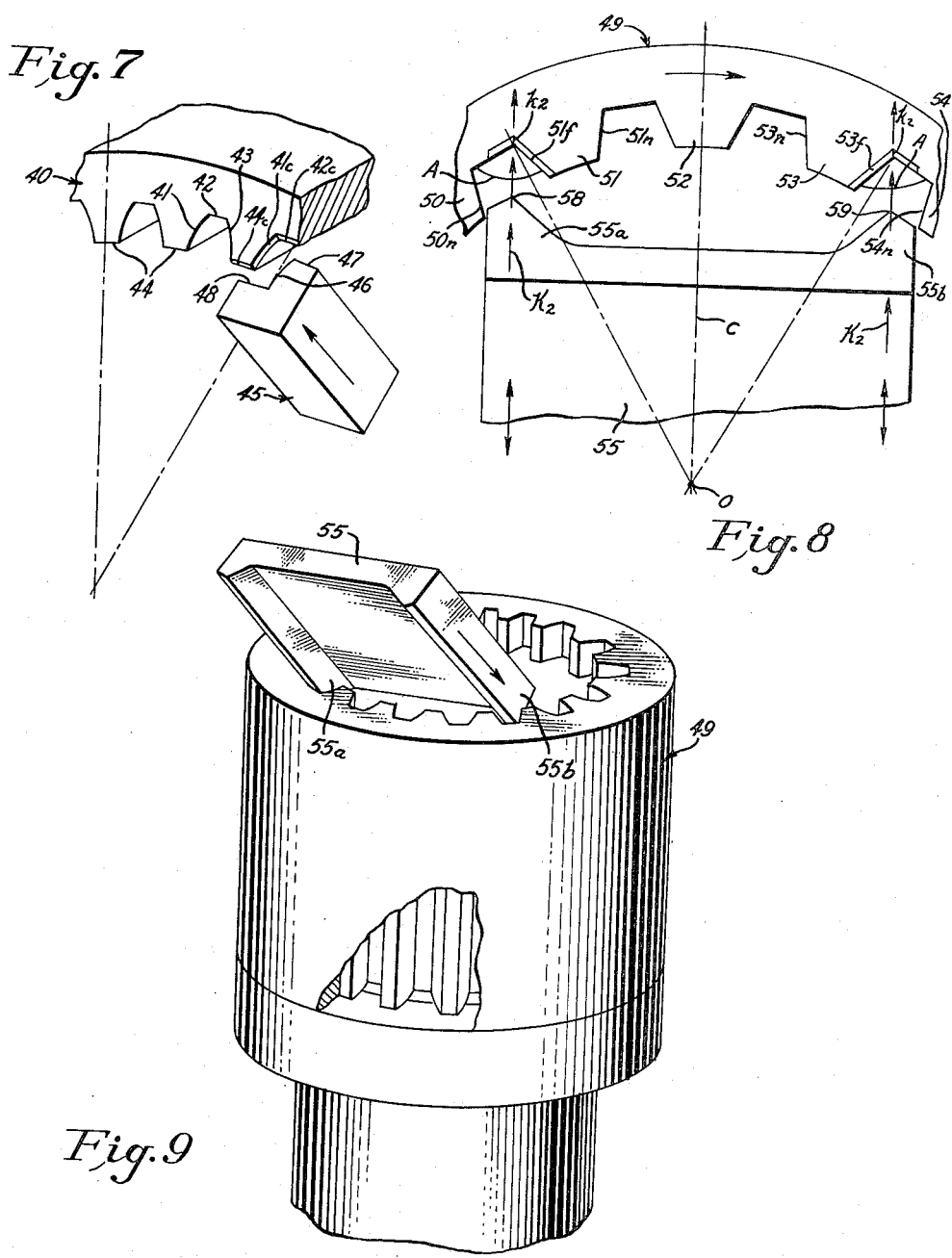

Aug. 14, 1956  J. M. CHRISTMAN  2,758,512
APPARATUS FOR CHAMFERING INTERNAL GEARS
Filed March 30, 1953  3 Sheets-Sheet 3
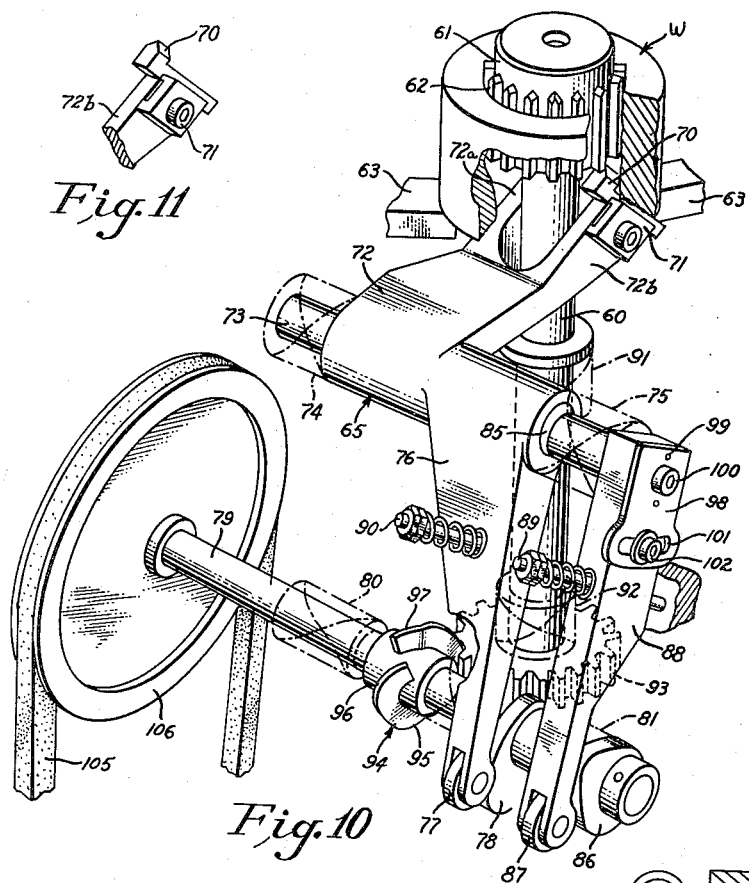
INVENTOR.
JOHN M. CHRISTMAN
BY Gregory S. Dolgorukov
ATTORNEY.

United States Patent Office 2,758,512
Patented Aug. 14, 1956

2,758,512

APPARATUS FOR CHAMFERING INTERNAL GEARS

John M. Christman, Detroit, Mich.

Application March 30, 1953, Serial No. 345,520

3 Claims. (Cl. 90—1.4)

This invention relates to apparatus for chamfering gears and other toothed machine elements, and more particularly to an improved apparatus for chamfering edges of teeth of internal gears and other internally toothed machine elements at the end faces of the teeth thereof.

The present application is a continuation-in-part of my co-pending applications Serial No. 137,420, filed on January 7, 1950 for Method and Means for Burring or Chamfering Gears, now U. S. Patent No. 2,688,480; Serial No. 232,630, filed on June 20, 1951 for Machine for Chamfering Gears and Clutch Means Thereof; Serial No. 278,891, filed on March 27, 1952 for Method and Apparatus for Chamfering Gear Teeth; and Serial No. 327,269 filed December 22, 1952 for Method and Apparatus for Chamfering Gears.

It has been well appreciated in the art that sharp edges and burrs produced in cutting gear teeth and similar machine elements at the end faces thereof are objectionable for many reasons, and that removal thereof by chamfering or rounding is exceedingly advantageous. The above is true with respect to spur gears, straight bevel gears, internal gears, ends of internally or externally splined shafts, and similar machine elements or parts. Moreover, the above holds true both for toothed machine elements where the axis of the tooth is perpendicular to the end plane and face thereof and the profile of the tooth appears undistorted at the end face thereof, as well as for machine elements or parts such as helical and hypoid gears where the axis of the tooth is at an inclined angle to the end face of the tooth and the profile of the tooth appears distorted at the face thereof.

While the above has been fully appreciated in the art, the accompanying disadvantages of the above condition have usually been considered unavoidable and cure therefor impracticable due mainly to hand filing or slow machining being prohibitively costly. Chamfering the entire end edges of tooth profiles of such gears and other machine elements or parts has not yet been put on high quantity production basis in spite of the numerous methods and machines proposed for such purposes. It should be appreciated that the end edges of a gear tooth or the lines forming its profile are curvilinear, and therefore guiding a suitable cutter along the required curvilinear edges presents many difficulties. While the top and edge of a gear tooth may be chamfered or rounded while the gear blank is being turned or machined in a lathe or a similar machine, no present day standard machine tool can be utilized for chamfering the side edges and the root edges of such gear teeth on a high quantity production basis.

A number of gear chamfering machines have been devised and offered to the trade. However, none of these machines received a universal or even sufficiently wide application to make gear chamfering a standard manufacturing process, since such machines are too slow and costly, or chamfer only one side of the gear tooth.

One of the objects of the present invention is to provide an improved method and an improved machine for chamfering the end edges of internally toothed elements, whereby such edges can be chamfered selectively at sides; sides and roots; side and tops; and sides, roots and tops; of the teeth of such toothed elements.

Another object of the invention is to chamfer, in effect, at least the end edges of one tooth for each stroke of the cutter.

A further object of the invention is to provide a simple and compact machine, with a minimum practicable number of parts, with its indexing and swinging parts made durable and of light weight, thereby permitting the cutter to be reciprocated at a high rate of speed.

A still further object of the invention is to apply the cutter so that it will urge the part to be chamfered against a part-locating stop, thus eliminating the necessity of clamping the part and enabling the operator to place on or remove the part from the arbor without stopping the machine, and ensuring production of chamfer of uniform depth on all parts in the production run.

A still further object of the present invention is to provide a machine for chamfering internal gears, in which machine the cutter is made to move in cutting from the internal recess of the work gear without interference with the gear-receiving arbor or the gear-locating means.

A still further object of the invention is to provide a machine to chamfer parts that have interferences such as undercuts, necks, shoulder and other interfering formations.

It is an added object of the invention to provide a machine of the foregoing character that is simple in construction, dependable in operation, requires but little skill to operate, and has form cutters easy to sharpen and having long life.

Further objects and advantages of this invention will be apparent from the following description and appended claims, reference being had to the accompanying drawings forming a part of this specification, wherein like reference characters designate corresponding parts in the several views.

Fig. 1 is a perspective view illustrating my improved method of chamfering edges produced on a body by a triangular recess provided therein and thus presenting the elementary condition found in chamfering internal gears and other internally toothed machine elements.

Fig. 2 is a perspective view of the construction of Fig. 1, with the observer looking from the opposite side, and showing the cutter in cutting engagement.

Fig. 3 is a side view, partly in section, of the constructions of Figs. 1 and 2.

Fig. 4 is a top view of the construction of Fig. 3.

Fig. 5 is an end view of the chamfering cutter illustrated in other views in Figs. 1–4.

Fig. 6 is a fragmentary perspective view of a portion of an internal gear, showing a chamfer produced thereon by a single passage of the chamfering cutter, similarly to the operation illustrated in Fig. 1.

Fig. 7 illustrates a portion of an internal gear and a cutter used for chamfering three meeting edges thereof during a single passage of the cutter.

Fig. 8 illustrates my improved method of chamfering the side and root edges of two spanned teeth of a gear by a single cutter having two cutting elements.

Fig. 9 is a view illustrating application of the cutter of Fig. 8 to an internal gear.

Fig. 10 is a perspective view illustrating the main portion of my improved machine for carrying out the chamfering method disclosed herein.

Fig. 11 is a perspective view illustrating separately one of the insertable cutter teeth used in the machine of Fig. 10.

Fig. 12 shows the top of the work-gear receiving arbor or spindle.

Fig. 13 illustrates two cutter teeth provided on the swinging arm encircling the gear-receiving arbor.

Fig. 14 illustrates a modified construction of the cutter teeth carrying arm, eliminating the necessity of recessing the arm in a manner shown in Fig. 13 to clear the arbor.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the present invention I do not follow the conventional method of chamfering gear teeth, particularly of internal gears and other internally toothed elements, by a cutter moving along a line passing through the center of the work gear; I chamfer the side, root, and the top edges of such elements, in any desired combination, by the use of a cutter moving along a line extending in the plane bisecting the angle formed by the two meeting edges to be chamfered. I prefer to use two cutting elements spaced from each other and moving along the line parallel to a radial line but spaced therefrom at equal distances of such magnitude as to cause the cutter to act on two spaced teeth and to satisfy the above requirement of bisecting the angles referred to above. I also provide an improved machine for carrying out the above method and utilizing a reciprocating swinging arm carrying such two cutting teeth, and actuating said teeth in such direction that in cutting they move from the internal recess of the gear (or other element) outwardly and press the work-gear against a support, thereby eliminating the necessity of clamping the work-gear for chamfering and ensuring production of uniform chamfer on all work-gears of separate production runs.

In the drawings there are illustrated, by way of example, my improved method of chamfering internal gears and other internally toothed elements for producing uniform or substantially uniform chamfer, as well as a machine adapted to carry out such method.

Referring specifically to Figs. 1–5, there is shown therein a workpiece 20 including a recess having edges 21 and 22 meeting at a vertex 23. A cutter generally indicated by the numeral 25 and having cutting edges 26 and 27 is shaped and is moved to produce uniform chamfer 21c and 22c along said edges 21 and 22, respectively.

In accordance with the invention, the cutter is moved to have its vertex point 28 move along the line K coinciding with the line $k$ which is the line of intersection of the planes of the chamfers 21c and 22c at the vertex 23. From an examination of the drawing it will be noted that said line K appears in the plan view shown in Fig. 4 as the line bisecting the angle formed by the edges to be chamfered, and in the elevational view, see Fig. 3, as the line coinciding with the line $k$ representing intersection of the planes of chamfers 21c and 22c.

It should be also noted that the cutter 25 is ground at its face 29 at an angle to provide a desired rake angle R for the cutter edges, and at its lower sides 30 and 31 to produce desired lip clearance angles on the cutter at the cutting edges 26 and 27.

By virtue of such a construction and movement, a theoretically uniform cut is produced along the edges 21 and 22, and the cutting process is continuous as is best illustrated in Fig. 2, reducing the power requirements for operating the cutter.

Referring to Fig. 6 showing a portion of an internal gear 40, it will now be appreciated that in chamfering an actual gear, in order to produce a substantially uniform chamfer along the edges of the gear at the face thereof, the cutter has to be moved not radially of the gear as has been the prior practice, but along the line substantially bisecting in plan view the angle formed by the side edges 41 and root edges 42, and in a side or elevational view along a line $K_1$ coinciding with the line $k_1$ at which the planes of the chamfers 41c and 42c intersect.

It will now be clear in view of the foregoing, that said line $K_1$ is not a radial line with respect to the gear, but is offset with respect to its center, or in other words said line $K_1$ does not pass through the center of the gear. It will be noted further that in moving the cutter for chamfering the edges 41 and 42 of an internal gear along such a line, only a portion of the edge 42 may be chamfered by such cutter due to the interference of the edge 43 of the adjacent tooth of the gear with such movement of the cutter.

Referring to Fig. 7 showing a portion of the gear 40 of Fig. 6 in another view, the cutter 45 illustrated in said Fig. 7 is provided with three cutting edges, namely 46, 47 and 48, the latter edge being added to chamfer the top edges 44 of the gear to produce chamfer 44c not produced on the portion of the gear 40 in Fig. 6.

It should be understood that from the standpoint of production of chamfer, the cutter may be moved from the interior of the gear outwardly therefrom, such as shown in Figs. 7 and 8, or from the outside of the gear inwardly thereof as shown in Fig. 9. It will be understood, however, that while the change in the direction of cutting may not affect the chamfer, it may affect the form of cutter-actuating means due to various mechanical interferences produced by the gear itself and by its holding means to the movements of the cutter, as will be explained later.

Figs. 1–7 illustrate chamfering internal gears with the use of a single cutter only. It will be understood, however, that in accordance with the invention, a two tooth cutter operating on two spaced teeth of the gear is actually used in practice. The advantages of this arrangement are found in much faster production and a better balanced machine. The requirements for the cutter of this nature can be best explained with reference to Figs. 8 and 9, wherein the cutter 55 is operating on the work gear 49.

Referring specifically to Fig. 8, it will be seen that in the application shown therein the cutter 55 employed for chamfering the work gear 49 has two teeth or cutting elements 55a and 55b, each formed and ground in accordance with the requirements generally explained above, for chamfering the side edges 51f and 53f of the teeth 51 and 53, as well as portions of the root edges adjacent thereto.

The side edges of internal gears chamfered in accordance with the present invention are what I sometimes term the "far side edges," i. e. the edges which are on the far side of the chamfered teeth from the radial line of the gear coinciding with the longitudinal axis of the cutter. It should be noted in this connection that as explained in my co-pending applications, in cases of external gears the side edges chamfered thereon in accordance with the invention are the "near side edges" of the teeth.

As in cases of external gears, in chamfering an internal gear with a two tooth cutter, the teeth to be chamfered, such as teeth 51 and 53 in the gear illustrated, are so selected that when the cutter is moved to have its center line C pass in plan view through the center O of the gear, the vertex points 58 and 59 of the two cutter teeth move along the lines $K_2$, $K_2$ parallel to said radial line C and bisecting as nearly as possible the angles A, A formed by the side and the root edges of the gear teeth to be chamfered. The more exactly said lines $K_2$, $K_2$ bisect said angles A, A, the more uniform will be the chamfer on the root and the side edges of the gear.

It will be understood that in practice the exactness of such bisecting is a matter of compromise governed by several considerations. The first consideration is, of course, the uniformity of chamfer. The second consideration is the ability to chamfer with each tooth of the cutter not less than one-half of the root edge without interference of the near side of the adjacent tooth with the movement of the cutter. Referring to Fig. 8, it can be seen that the edges 50n and 54n, which are the near side edges of the teeth 50 and 54, respectively, would interfere with the cutter 55 if more than the portions shown at the root edges adjacent to the side edges 51f and 53f of the teeth 51 and 53 were chamfered. It will be also understood that should the cutter be made to chamfer two teeth spaced further apart than teeth 51 and 53, such interferences will be still greater and the cutter will not be able to chamfer more than one-half of the root edges.

In accordance with the invention, the work gear 49 is indexed one tooth for each working stroke of the cutter. In consequence of such an operation, if the work gear 49 is indexed in a clock-wise direction, as indicated by the arrow, after two strokes of the chamfering cutter 55 and the next indexing movements of the gear, the side edge 51n of the tooth 51, being in the position shown as a "near side" edge of the tooth, will then be in the position of the edge 53f. In other words, it will move to become a "far side" edge of the tooth and will be chamfered by the third stroke of the cutter tooth 55b, thereby chamfering of the tooth 51 will be completed.

After the third cutting stroke of the cutter 55, the edge 50n of the tooth 50 will index into the position of the edge 53f and will be chamfered by the fourth stroke of the cutter tooth 55b together with the part of the root edge adjacent thereto. It will now be seen, that if more than one-half of the root edge adjacent to 51f were chamfered in the position shown in Fig. 8, then on the fourth cutting stroke the remaining portion of the root edge will be chamfered, and since the cuts are slightly overlapping there will be virtually no ridge or appreciable intersection line in the middle of such edge, and chamfering of said root edge will thus be completed. Thus, it will be appreciated that, in effect, one gear tooth is chamfered fully for each cutting stroke.

It should be appreciated that in actual practice the chamfers may vary slightly from the theoretical ideals of uniformity, but the difference in practical cases will be measured in a few thousands of an inch only and may be safely neglected as being much less than the allowable chamfer variations.

The cutter 55 is moved at an angle with respect to the face of the work gear 49, as is best shown in Fig. 9. This angle is equal to the angle which the lines of intersection of the planes of the chamfers of the edges 51f, 53f, with their adjacent root edges, make with the face of the gear. Said angle may be experimentally found, or may be computed starting with the desired angle to which said edges are chamfered.

In Fig. 9 the work gear 49 is shown supported at its lower face, i. e. the face opposite to the face at which it is chamfered. Such showing is made in Fig. 9 solely for the purpose of clarity of illustration. In accordance with the invention, I prefer to locate or support the work gear at the face to be chamfered, and to move the cutter, in the process of cutting, in the direction toward the support. By such an expedient I attain two important objects or advantages. First, I eliminate the variations in the chamfer which are caused by unavoidable manufacturing variations in the height of the gears; and, second, I eliminate the necessity of clamping the gear, since the cutter, by pushing the work gear toward its support, tends to steady it on such support rather than to disturb its position thereon.

Figs. 10, 13 and 14 illustrate such an expedient and show the cutters moving, in the process of cutting, from the interior of the gear outwardly therefrom, pushing the work gear against the supports provided on the bottom face of the work gear. It will be noted that if the face to be chamfered is the bottom face of the gear, the above expedient will completely eliminate variations in the chamfer. In relatively rare cases where the face to be chamfered is slightly above the face at which the gear is supported, such as in the arrangement shown in Fig. 14, the variation in the chamfer will be greatly reduced, since variations in the relatively small dimension from the bottom face of the gear to the face to be chamfered is relatively small, and the manufacturing variations in said dimensions are insignificant.

Figs. 10–12 illustrate one form of the machine adapted to carry out the method of the present invention. The machine illustrated in said figures includes means to receive the work gear W and to locate the same properly with respect to the cutter. The locating means include an arbor 60 having at its upper end a radially extended pilot portion 61 of the diameter corresponding to the diameter of the internal gear measured at the tops of its teeth. Thus, the work gear W can be placed on said pilot portion 61 and be slid downwardly until its teeth meet the heavily chamfered external teeth 62 provided on the arbor 60 and generally corresponding in shape to the recesses between the teeth of the work gear W. Supports 63 external to the arbor are provided and are adapted to support the work gear W at a desired height. Thus, the pilot portion 61 of the arbor locates the work gear from movements transversely of the arbor or radially thereof, while the supports 63, 63 locate the work gear W along the axis of the arbor, i. e. axially thereof. The teeth 62 of the arbor locate the work gear W peripherally, which is to say, prevent rotative movements thereof. The teeth 62 also constitute means for rotating the work gear W in the process of indexing thereof.

The cutting means are exemplified by two reciprocating chamfering cutters 70, with only one of said cutters being shown in Fig. 10 and with the same cutter shown separately in Fig. 11. The cutters are secured with the aid of clamps 71 to the upper arm 72 of a racket 65, which bracket is mounted for limited rotation on a shaft 73. The arm 72 straddles the arbor as shown, in order to bring the cutters to the opposite side of the arbor 60. The shaft 73 is journaled in suitable bearings, omitted for the sake of clarity of the drawing but indicated at 74 and 75. The bracket 65 has a second crank or arm 76, the follower end whereof carries a roller 77. The roller 77 cooperates with a stroke cam 78 provided on a drive shaft 79, which shaft is mounted in suitable bearings indicated at 80 and 81. It will now be seen in view of the foregoing that as the drive shaft 79 rotates, the cam 78 operates the roller 77 and causes the lower end of the bracket 65 to oscillate on the shaft 73 through an angle determined by the shape and the size of the cam 78. The size and the shape of the cam 78 are selected to impart desired movements to the cutter-carrying ends 72a and 72b of the arm 72 of the bracket 65 and the cutters 70.

Means are provided to position the cutters for cutting stroke and to relieve said cutters from contact with the work on the return stroke. Said means are exemplified by an eccentric connection between the shaft 73 and the bracket 65. Such a connection may be in the form of a straight cylindrical shaft and an eccentric bore therefor in the bracket 65, or be in the form of a concentric bore in the bracket 65 engaged by an eccentric carried by the shaft 73. Other types of eccentric connections may also be used. In the embodiment illustrated, the required eccentric connection is in the form of an eccentric member 85 provided on the shaft 73. The eccentric member 85 is actuated through a relatively small portion of one revolution of the shaft 79, such as 15 degrees, with the aid of a relieving cam 86 cooperating with a roller 87 carried by an arm 88 connected to the shaft 73.

As the relief cam 86 rotates to move the roller-carrying end of the arm 88 away from the shaft 79, the eccentric member 85 turns and raises the bracket 65 and the cutter-carrying arm 72 thereof, bringing the cutters into their cutting position and holding them in such position while cutting takes place. When the cutting stroke of the cutters comes to an end, continued rotation of the relief cam 86 permits the spring mechanism 89 to bring the roller 87 closer to the shaft 79, thus moving the eccentric member 85 downwardly. Such movement of said member 85 causes the arm 72 to move together with the cutters for a predetermined distance downwardly or away from the work, thus relieving the cutter. A spring mechanism 90 similar in its construction and function to the spring mechanism 89, operates to hold the roller 77 in constant contact with the stroke cam 78.

As disclosed in my said co-pending application, Serial No. 327,269, filed on December 22, 1952, virtually any desired nature of the cutter movement cycle may be effected by properly shaping and positioning stroke and relief cams on their drive shaft 79.

The lower end of the arbor 60 is journaled in suitable bearings as indicated at 91 and 92 and carries at its extremity an indexing gear 93 having the same number of teeth as the work gear W. An interrupted worm 94 is provided on the shaft 79, said worm being in mesh with the indexing gear 93. The worm 94 has a straight circular middle portion 95, and helical ends 96 and 97, spaced to engage one tooth of the index gear 93 after another. By virtue of such a construction, the indexing gear 93 remains stationary for approximately one-half of a turn of the drive shaft 79, during which time the cutters chamfer, in effect, one tooth of the work gear W and return to the starting point. During the other approximately one-half turn of the drive shaft 79, the gear 93, the arbor 60, and the work gear W are indexed one tooth. This arrangement provides rapidly operating and durable indexing means. It will be noted that the arbor 60 may be of integral construction, or be made articulated and consist of several parts connected or secured together in any suitable or desired manner.

Means are provided for adjusting or setting the machine for lighter or heavier chamfers. Said means are exemplified by an adjustment plate 98 secured or fixed to the end of the eccentric shaft 73 by two pins 99 and a screw 100. The adjusting plate 98 is provided with an arcuate slot 101 accommodating and adjusting screw 102, which screw is tightened to lock the adjusting plate to the arm 88, to provide a desirable adjustment thereof with respect to the shaft 73. It will be understood in view of the foregoing that the above adjustment affects position of the eccentric member 85 and either lowers or raises the cutters with respect to the work.

If a very heavy chamfer is desired, the adjusting plate 98 can be set so that the cutters will take a first cut on the work gear W, whereupon the work gear is run through a second time with the adjusted plate reset to take a second cut to the full depth chamfer.

Since the work gear W is not clamped down, it may not be necessary under some conditions that the cutters be relieved on the return stroke; in which event the shaft 73 may be a plain shaft without the eccentric portion 85; and the relief cam 86, arm 88, spring mechanism 89, and adjustment plate 98 may be eliminated.

The machine is driven from a suitable electric motor (not shown) with the aid of a V belt 105 and a pulley 106.

When the cutters span only a few teeth, or in cases of larger work gears; such as the work gear W of Fig. 13, it may be desirable to make the cutters-supporting arm solid, such as shown at 110 in said Fig. 13, providing in such arm a clearance hole 111 for the passage of the work spindle or arbor 60.

Fig. 14 illustrates a further modification of the cutters-carrying arm, which modification is particularly advantageous when gears have to be chamfered at a face within the bore thereof, as in the gear W₂. Under such conditions, an arm 115 having a pivoting point such as 116 above the cutters 117, carries said cutters intermediately the ends of the arm 116.

Internal spiral gears are cut following the general principles disclosed above for internal spiral gears, except that compensation is made for the helical angle of such spiral gears.

By virtue of the provision of the machine disclosed above, the objects of the present invention and numerous additional advantages are attained.

I claim:

1. A machine for chamfering end edges of internal gears, said machine comprising a work-gear receiving arbor, an external tooth element provided on the upper end of said arbor, said external tooth element corresponding to the internal recess of the internal gear to be chamfered and adapted to receive said internal gear upon itself and to engage its teeth for driving, a stop adapted to locate the lower face of the work-gear at a predetermined plane transverse to the axis of the arbor, two cutting elements, and a reciprocatingly swinging arm hinged between its ends and having one of its ends extending around and beyond said arbor and carrying said cutting elements, the other end of said arm being adapted to receive actuating forces to swing the arm, and means engaging said other end and actuating the same to move the cutting elements carried by the opposite end of said hinged arm through their operative cycle.

2. A machine for chamfering end edges of internal gears, said machine comprising a work-gear receiving arbor, an external gear on the upper end of said arbor, said external gear corresponding to the internal recess of the internal gear to be chamfered and adapted to receive said internal gear upon itself and to engage its teeth for driving, a stop adapted to locate the lower face of the work-gear at a predetermined plane perpendicular to the axis of the arbor, two cutting elements, and a reciprocatingly swinging arm hinged at one of its ends with the other end thereof being adapted to receive actuating forces, said arm being adapted to carry said cutting elements between its ends to make the same operate on the teeth of the work-gear at the arm side of said arbor.

3. A machine for chamfering end edges of internal gears, said machine comprising a work gear-receiving arbor including an element adapted to receive a work gear and to engage the teeth thereof for rotation of said gear, means locating the lower face of the gear at a predetermined plane perpendicular to the axis of said arbor, two cutting elements, a reciprocating swinging arm carrying said elements and adapted to move the same during their cutting stroke from the internal recess of the gear downwardly and outwardly of the work gear and pressing said gear in the process of cutting against said locating means but clearing the same, the gear-receiving means on said arbor being in the form of an external gear corresponding to the internal recess of the work gear and having the sides of the upper ends of its teeth chamfered in a substantial degree, and an upward cylindrical extension on said external gear having diameter substantially equal to the root diameter of said external gear, said extension being thus adapted to locate the work gear coaxially with the arbor as the gear is being placed thereon, with said chamfer operating to facilitate engagement of the teeth of the internal work gear with the teeth of the external gear provided on said arbor.

References Cited in the file of this patent

UNITED STATES PATENTS 2,433,201    Cross   ---------------- Dec. 23, 1947